US009344793B2

(12) United States Patent  
Selig et al.

(10) Patent No.: US 9,344,793 B2  
(45) Date of Patent: May 17, 2016

(54) AUDIO APPARATUS AND METHODS

(71) Applicant: Symphonic Audio Technologies Corp., San Francisco, CA (US)

(72) Inventors: Aaron Alexander Selig, San Francisco, CA (US); Varun Srinivasan, San Francisco, CA (US)

(73) Assignee: Symphonic Audio Technologies Corp., San Francisco, CA (US)

( * ) Notice: Subject to any disclaimer, the term of this patent is extended or adjusted under 35 U.S.C. 154(b) by 14 days.

(21) Appl. No.: 14/463,559

(22) Filed: Aug. 19, 2014

(65) Prior Publication Data

US 2015/0078575 A1 Mar. 19, 2015

Related U.S. Application Data

(60) Provisional application No. 61/867,464, filed on Aug. 19, 2013, provisional application No. 61/880,405, filed on Sep. 20, 2013.

(51) Int. Cl.  
*H04R 1/10* (2006.01)  
*H04M 1/60* (2006.01)  
*H04R 25/00* (2006.01)

(52) U.S. Cl.  
CPC ............ *H04R 1/1091* (2013.01); *H04R 1/1041* (2013.01); *H04M 1/6033* (2013.01); *H04M 1/6058* (2013.01); *H04R 1/1083* (2013.01); *H04R 25/50* (2013.01); *H04R 2201/107* (2013.01); *H04R 2410/05* (2013.01); *H04R 2420/07* (2013.01); *H04R 2430/01* (2013.01); *H04R 2460/01* (2013.01); *H04R 2499/11* (2013.01)

(58) Field of Classification Search  
None  
See application file for complete search history.

(56) References Cited

U.S. PATENT DOCUMENTS

| | | | |
|---|---|---|---|
| 6,813,490 B1 * | 11/2004 | Lang | H04M 1/72563 204/221 |
| 6,853,850 B2 | 2/2005 | Shim et al. | |
| 2002/0100044 A1 | 7/2002 | Daniels | |
| 2003/0003864 A1 | 1/2003 | Locke | |
| 2004/0102931 A1 | 5/2004 | Ellis et al. | |
| 2005/0260985 A1 | 11/2005 | Rader et al. | |
| 2007/0255435 A1 * | 11/2007 | Cohen | H04R 1/1016 700/94 |
| 2009/0076825 A1 * | 3/2009 | Bradford | H04R 25/552 704/271 |
| 2009/0154745 A1 | 6/2009 | Latzel | |
| 2009/0180631 A1 * | 7/2009 | Michael | H04R 29/008 381/58 |
| 2010/0119093 A1 | 5/2010 | Uzuanis et al. | |
| 2010/0145134 A1 * | 6/2010 | Madsen | A61F 5/58 600/23 |

(Continued)

*Primary Examiner* — Peter Vincent Agustin  
(74) *Attorney, Agent, or Firm* — Jeffrey Schox; Ivan Wong

(57) ABSTRACT

An apparatus for augmenting audio capabilities of a mobile computing device, including: a housing transiently encasing a portion of the mobile computing device; a communication module arranged within the housing, downloading a hearing profile of a user from the mobile computing device, and receiving an output audio signal from the mobile computing device; a processor arranged within the housing and processing the output audio signal according to the hearing profile; a secondary audio output module arranged within the housing adjacent an integrated loudspeaker within the mobile computing device and outputting a processed form of the output audio signal in place of output of the output audio signal by the integrated loudspeaker; a secondary microphone arranged within the housing adjacent an integrated microphone within the mobile computing device, the communication module transmitting an input audio signal from the secondary microphone to the mobile computing device.

22 Claims, 6 Drawing Sheets

(56) References Cited

U.S. PATENT DOCUMENTS

| | | |
|---|---|---|
| 2010/0191143 A1 | 7/2010 | Ganter et al. |
| 2011/0280409 A1 | 11/2011 | Michael et al. |
| 2011/0280422 A1 | 11/2011 | Neumeyer et al. |
| 2011/0293123 A1 | 12/2011 | Neumeyer et al. |
| 2011/0300806 A1 | 12/2011 | Lindahl et al. |
| 2012/0021808 A1 | 1/2012 | Tseng |
| 2012/0057078 A1 | 3/2012 | Fincham |
| 2012/0183163 A1 | 7/2012 | Apfel |
| 2012/0306631 A1* | 12/2012 | Hughes ............... H04M 19/047 340/407.1 |
| 2013/0052956 A1 | 2/2013 | McKell |
| 2013/0142366 A1 | 6/2013 | Michael et al. |
| 2013/0177189 A1 | 7/2013 | Bryant et al. |
| 2014/0314261 A1* | 10/2014 | Selig ...................... H04R 25/50 381/314 |
| 2014/0334644 A1* | 11/2014 | Selig ...................... H03G 5/165 381/108 |
| 2014/0379343 A1* | 12/2014 | Karimi-Cherkandi .. G10L 21/02 704/246 |
| 2015/0078575 A1* | 3/2015 | Selig ..................... H04R 1/1091 381/74 |

\* cited by examiner

AUDIO APPARATUS AND METHODS

CROSS-REFERENCE TO RELATED APPLICATIONS

This application claims the benefit of U.S. Provisional Application No. 61/867,464, filed on 19 Aug. 2013, and to U.S. Provisional Application No. 61/880,405, filed on 20 Sep. 2013, both of which are incorporated in their entireties by this reference.

This application is related to U.S. patent application Ser. No. 14/178,034, filed 11 Feb. 2014, U.S. Provisional Application No. 61/763,163, filed on 11 Feb. 2013, U.S. Provisional Application No. 61/831,796, filed on 6 Jun. 2013, U.S. Provisional Application No. 61/867,436, filed on 19 Aug. 2013, and U.S. Provisional Application No. 61/880,367, filed on 20 Sep. 2013, all of which are incorporated in their entireties by this reference.

This application is further related to U.S. patent application Ser. No. 14/178,068, filed 11 Feb. 2014, U.S. Provisional Application No. 61/763,182, filed on 11 Feb. 2013, U.S. Provisional Application No. 61/867,449, filed on 19 Aug. 2013, and U.S. Provisional Application No. 61/880,377, filed on 20 Sep. 2013, all of which are incorporated in their entireties by this reference.

This application is further related to U.S. patent application Ser. No. 14/206,499, filed 12 Mar. 2014, U.S. Provisional Application No. 61/778,188, filed on 12 Mar. 2013, U.S. Provisional Application No. 61/831,798, filed on 6 Jun. 2013, U.S. Provisional Application No. 61/867,480, filed on 19 Aug. 2013, and U.S. Provisional Application No. 61/880,395, filed on 20 Sep. 2013, all of which are incorporated in their entireties by this reference.

TECHNICAL FIELD

This invention relates generally to the field of personal audio devices, and more specifically to a new and useful audio apparatus and method in the field of personal audio devices.

DESCRIPTION OF THE EMBODIMENTS

The following description of the embodiments of the invention is not intended to limit the invention to these embodiments, but rather to enable any person skilled in the art to make and use this invention.

1. Smart Headphone Device

Figure 1:
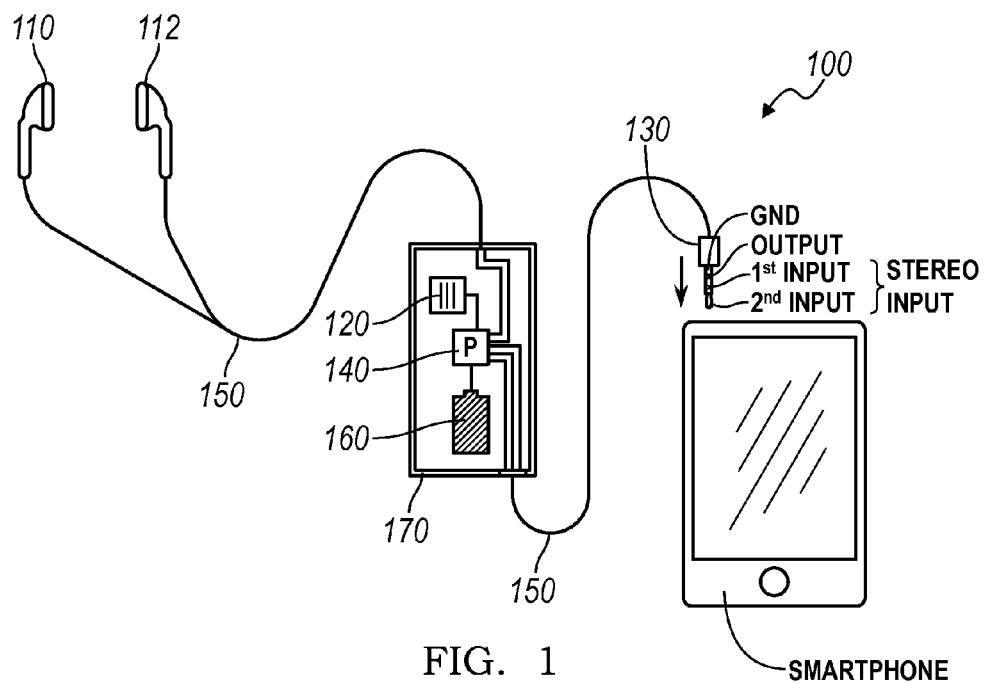
FIG. 1 is a schematic representation of a smart headphone device in accordance with the invention.

As shown in FIG. 1, a smart headphone device includes: a left speaker 112; a right speaker 110; a microphone 120; a jack 130 including a first input pin, a second input pin, and an output pin; a processor 140 coupled to the first input pin and to the second input pin and is configured to receive an audio output profile from a computing device via the first input pin, to receive a stereo audio signal via the first input pin and the second input pin, and to modify the stereo audio signal according to the audio output profile; a cable 150 configured to communicate a left component of the stereo audio signal to the left speaker 112 and to communicate a right component of the stereo audio signal to the right speaker 110; and a battery 160 configured to power the processor 140.

Generally, the smart headphone device functions to apply an audio output profile to an audio signal to augment a user's hearing experience. For example, the smart headphone device can apply the audio output profile to an audio signal to compensate for a user's hearing ability, as defined by a user hearing profile and determined through a hearing test, as described in U.S. patent application Ser. No. 14/178,034, U.S. patent application Ser. No. 14/178,067, and U.S. patent application Ser. No. 14/206,499. The smart headphone device can also apply the audio output profile to the audio signal to compensate for ambient conditions (e.g., noise), local environmental conditions (e.g., sound response profile of a room occupied by the smart headphone device), a user action or activity (e.g., exercising), an output response of the smart headphone device, etc.

Due to the vast number of computing devices used by consumers to playback audio files and communicate audio data with other devices, such as different smartphones, MP3 and other personal music players, tablets, laptop and desktop computers, personal data assistants, car stereo systems, phone conferencing systems, etc. models from the same and different manufacturers, as well as the vast number of third-party native applications that execute on the various computing devices and control audio output, application of a user's hearing profile in the form of an audio output profile within multiple native applications across multiple difference devices can be cumbersome for a user attempting to synchronize audio output profiles across devices. Such functionality, implemented within each discrete device or within each native application, may also require developers to integrate cross-platform and inter-app communication to maintain updated audio output profiles and may require hardware manufacturers to integrate wired or wireless systems and communication protocols to support synchronization and/or communication of audio output profiles across various devices. However, the smart headphone device may bypass such hurdles by defining a singular computing-device-agnostic personal audio device that receives an audio output profile, implement the audio output profile to process an audio signal, and outputs the processed audio signal through one or more speakers for a user. The singular smart headphone device can therefore be implemented across various computing devices to output audio of various types from various native applications across various platforms, etc.

The smart headphone device includes a left speaker 112 and a right speaker 110. Each speaker can be incorporated into an earbud, such as the left speaker 112 in a left-ear-specific earbud and the right speaker 110 in a right-ear-specific earbud. Alternatively, the left and right speakers can be incorporated in over-ear housings. Yet alternatively, the smart headphone device can include a singular speaker, such as implemented in a Bluetooth headset. However, the smart headphone device can include the left speaker 112 and/or the right speaker no of any other type and incorporated in any other way.

The microphone 120 of the smart headphone device is configured to output an audio signal corresponding to local sound, such as the voice of a user. The microphone 120 can be arranged on the smart headphone device such that the microphone 120 is substantially near the user's mouth when the smart headphone device is worn by the user (e.g., the left and right earbuds containing the left and right speakers are inserted into the user's ears). Alternatively, the microphone 120 can be arranged on one (e.g., the left) earbud of the smart headphone device. In this implementation, smart headphone device can include a second microphone arranged on a second (e.g., the right) earbud of the smart headphone device. However, the microphone 120 can be arranged in any other way and can be configured to output any other suitable signal.

The jack 130 of the smart headphone device includes a first input pin, a second input pin, and an output pin. The jack 130 can be in the form of a 3-5 mm male stereo plug or standard (i.e., ubiquitous) male headphone plug. The first input pin can correspond to a left audio channel, the second input pin can correspond to a right audio channel, the output pin can correspond to a microphone line out channel, and the jack 130 can include a fourth pin that corresponds to a ground. In this configuration, a stereo audio signal can be transmitted into the smart headphone device via the first and second input pins, and digital data can be transmitted into the smart headphone device over the stereo audio signal, such in the form of high frequency serial blips discernible by the processor 140 but difficult for a human to detect. The jack 130 can alternatively take the form of a digital data plug, such as a micro or mini USB plug. In this implementation, the stereo audio signal (and a microphone signal) can be transmitted in analog or digital format from a connected device (e.g., a computing device) to the smart headphone device. However the jack 130 can be of any other form and connect the smart headphone device to an external computing device or audio device in any other suitable way.

The processor 140 of the smart headphone device is coupled to the first input pin and to the second input pin of the jack 130 and is configured to receive an audio output profile from a computing device via the first input pin, to receive a stereo audio signal via the first input pin and the second input pin, and to modify the stereo audio signal according to the audio output profile. Generally, the processor 140 functions to modify an audio input signal (e.g., a stereo audio signal) according to the audio output profile to accommodate a hearing ability, a hearing need, and/or a hearing preferences of the user and/or to adjust to the audio output profile to accommodate the user's current ambient environment. For example, the processor 140 can include a signal processing unit and an audio driver, wherein the signal processing unit receives the audio input signal and manipulates the audio input signal according to the audio output profile, and wherein the audio driver outputs a (relatively) higher-power signal capable of driver the left speaker 112 and/or the right speaker 110.

The processor 140 can receive the audio output profile from a connected device, such as over a wired or wireless connection. For example, the jack 130 can be plugged into a corresponding female jack within a smartphone (or tablet, laptop, desktop computer, etc.), and the smartphone can transmit the audio output profile to the processor 140 as a series of timed analog blips (e.g., representing digital bits, or is and os) over the first and/or second input pins (e.g., according to a frequency-shift keying technique), wherein the processor 140 decodes the blips into the audio output profile. The smartphone can transmit—and the processor 140 can receive and decode—such analog blips while an audio signal is transmitted over the first and second input pins, or the smartphone can transmit the analog blips independently of an audio signal, such as prior to beginning playback of a song track into the smart headphone device. Alternatively, the smart headphone device can include a wireless communication module (e.g., wireless transceiver) configured to sync with the smartphone (or other computing device), to receive the audio output profile from the smartphone, and to communicate the received audio output profile to the processor 140 for subsequent implementation. For example, the wireless communication module can communicate with the smartphone over Bluetooth, Wi-Fi or other radio communication protocol.

The processor 140 can also store the audio output profile such that the smart headphone device can be used across multiple computing devices without communicating with the other computing devices to receive additional audio output profiles. For example, the wireless communication module can sync the smart headphone device with a master computing device (e.g., the user's smartphone) and receive the audio output profile from the master computing device, and the processor 140 can apply the audio output profile received from the master computing device to audio signals received from various other audio playback devices connected to the smart headphone device. The processor 140 can additionally or alternatively apply a dynamically apply the audio output profile to an audio signal (e.g., a prerecorded song) based on a quality of the audio signal, such as a based on bit rate, metadata (e.g., artist, genre), environmental conditions (e.g., ambient noise, headphone profile), etc.

As described in U.S. patent application Ser. No. 14/178,034, U.S. patent application Ser. No. 14/178,067, and U.S. patent application Ser. No. 14/206,499, the audio output profile can correspond to the user's hearing profile such that, when processor applies the audio output profile to the audio input signal, the processed audio signal accommodates the user's hearing ability, such as by boosting frequencies that the user does not hear well and attenuating frequencies for which the user is particularly sensitive. The audio output profile can also include a composite of one or more of the user's hearing profile, an output response of the connected device, an output response of the smart headphone device, an audio playback preference of the user, a sound response of a room occupied by the user, etc., as described below.

The processor 140 can apply the audio output profile to modify an equalizer (EQ) setting for one or both channels of the audio signal, to independently or collectively increase or decrease the volume of each channel of the audio device, apply a sound effect (e.g., reverb, chorusing, distortion, etc.) to one or more channels of the audio input signal, or modify the audio input signal in any other way according to the audio output profile. Audio output adjustments defined by the audio output profile can be static, that is, constant through application of the audio output profile over time.

Alternatively, audio output adjustments defined by the audio output profile can be dynamic. In this implementation, the processor 140 can interface with one or more sensors within the smart headphone device, with one or more sensors within the connected device, or with the connected device generally to detect and respond to a changing ambient or local environmental condition and/or a changing user action, activity, condition, etc. In one example, the processor 140 can cooperate with the microphone 120 to collect ambient sound and to estimate a local environment based on the ambient sound. In this example, the processor 140 can predict a number or activity of people proximal the user or a sound response of the room currently occupied by the user, and the processor 140 can plug such predicted or estimated information into the audio output profile to adjust audio output adjustments (i.e., volume, EQ settings, effects, etc.) accordingly, thereby accommodating the detected changing environmental condition for the user such that the user's perceived listening experience is substantially unchanged despite the changing environmental condition. Similarly, the processor 140 can cooperate with the microphone 120 to determine that the user has walked from a noisy room into quiet room and decrease a volume of the audio output accordingly. In another example, the processor 140 can interface with an accelerometer and/or gyroscope to predict a change in the user's current action or activity and then modify the audio output profile accordingly. In this example, the processor 140 can correlate an accelerometer and/or gyroscope output at a first time with walking and an accelerometer and/or gyroscope output at a second time with running and then increase volume bass output parameters of the audio output profile in response to the user's detected transition from walking to running.

In this implementation, the processor 140 can additionally or alternatively receive user or environment data from the connected device, such as over a wired or wireless connection, as described above. For example, the processor 140 can receive a GPS location, a user action or activity determined from an accelerometer or gyroscope output, a calendar event, etc. from a connected smartphone and modify parameters of the audio output profile accordingly. Alternatively, the connected device can update the audio output profile in response to data collected by the connected device, and the processor 140 can receive the updated audio output profile and implement the updated audio output profile accordingly. For example, the processor 140 can transition from a previous audio output profile to a new audio output profile once a new audio output profile download completes, such as by transitioning from parameter settings of the old audio output profile to parameter settings of the new audio output profile over a period of ten seconds. However, the processor 140 can function in any other way to dynamically adjust parameters of the audio output profile or to implement updated audio output profiles over time.

The processor 140 can also interface with the microphone 120 to implement noise cancellation. However, the processor 140 can manipulate or modify an audio input signal in any other way to improve, augment, or control the user's listening experience.

The cable 150 of the smart headphone device is configured to communicate a left component of the stereo audio signal to the left speaker 112 and to communicate a right component of the stereo audio signal to the right speaker no. Generally, the cable 150 connects a right output channel of the processor 140 (e.g., a right audio driver) to a right speaker 110 and a left output channel of the processor 140 (e.g., a left audio driver) to left speaker 112. The cable 150 can also define a junction that splits between the speakers and the processor 140 to feed discrete channels of the processed audio signal to the left and right speakers.

The battery 160 of the smart headphone device is configured to power the processor 140. The battery 160 can be a rechargeable battery, such as a lithium-ion or a nickel-cadmium rechargeable battery.

In one implementation, the battery 160 is recharged through the jack 130, wherein a negative terminal of the battery 160 is connected to the ground pin of the jack 130, and wherein the positive terminal of the battery 160 is connected to one or both of the input pins of the jack 130. In one example, a native charging application executes on a connected device (e.g., a smartphone), wherein the native charging application handles distribution of power from the connected device into the smart headphone device via the jack 130 to charge the battery 160. In this example, when the user selects the native charging application or selects a "charge" feature within the native charging application, the native application can check that the smart headphone device is connected, such as by transmitting a series of high-frequency pulses over the first and/or second input pin and receiving a confirming signal from the processor 140 over the output pin in the jack 130. The native charging application can then implement a similar technique to transmit a command to the processor 140 to disconnect or turn off an audio output to the left and right speakers and to connect the first and second input pins to a Vcc input of battery charging circuit 162 or directly to the positive terminal of the battery 160. For example, the processor 140 can toggle a transistor arranged between the positive terminal of the battery 160 and an audio output pin of the left audio driver within the processor 140. The native charging application can then output a sinusoidal audio signal at a peak power level (or peak long-duration power level) into the first and second input pins within the jack 130. A rectifier within the smart headphone device can then convert the sinusoidal audio signal into a DC signal, a boost circuit within the smart headphone device can boost the low voltage DC signal into a higher voltage signal to feed into a battery charging circuit 162, and the battery 160 charging circuit can monitor voltage and/or current into the battery 160 during the charge cycle. Alternatively, the processor 140 can monitor battery voltage, transmit battery voltage data to the connected device (e.g., over the output pin), and the native charging application can adjust the frequency and/or amplitude of the output signal to complete a battery voltage-dependent charging cycle.

In another implementation, the battery 160 is recharged through a USB adapter. For example, the smart headphone device can be part of a kit including a USB charging adapter. In this example, the USB charging adapter can include a female audio jack and a male USB jack, the female audio jack configured to receive the jack 130 of the smart headphone device, the male USB jack configured to engage a computer, wall adapter, or other female USB jack to source power to charge the battery 160 within the smart headphone device. When the user inserts the jack 130 into the USB charging adapter and inserts the USB charging adapter into a computer, the USB charging adapter can transmit a request to the computer—through male USB jack—to source higher current. The USB charging adapter can also transmit a request to the processor 140 to turn off the speakers and connect the battery 160 to the first and/or second input pins, such as described above, to transition the smart headphone device from an audio playback mode to a charging mode. Alternatively, the smart headphone device can include a hard button or other input region 180 selectable by the user to toggle between an audio playback mode to a charging mode. Once the smart headphone device has entered the charging mode and is connected to the USB charging device, a battery charging circuit 162 within the USB charging adapter can monitor the voltage and current of a power signal fed into the jack 130 to charge the battery 160, or a battery charging circuit 162 within the smart headphone device can condition a power signal from the USB charging adapter to achieve a proper battery recharge cycle.

In a similar implementation, the smart headphone device can include an additional port, such as a female mini-USB or micro-USB port configured to receive a male jack. The additional port can be connected to the battery 160 or to a battery charging circuit 162 and thus feed power from a connect device or power adapter into the smart headphone device to charge the battery 160.

However, the smart headphone device can include any other component or feature and interface with any one or more other devices or peripheral to recharge the battery 160.

Alternatively, the smart headphone device can exclude a battery, and components within the smart headphone device can be powered directly by the connected mobile computing device.

The smart headphone device can also include a housing 170 configured to contain one or more components of the smart headphone device. In one implementation, the battery 160, the processor 140, and the microphone 120 are arranged in the same, singular housing. In this implementation, the cable 150—of some length—extends out of the housing 170 and connects to the left and right speakers. A second cable also extends out of the housing 170 and connects to the jack 130, as shown in FIG. 1. In this implementation, the length of the cable 150 can be such that, when the left and right speakers are worn in the user's ears, the housing 170 rests near the user's sternum and/or just below (e.g., within three inches of) the user's chin.

Figure 2:
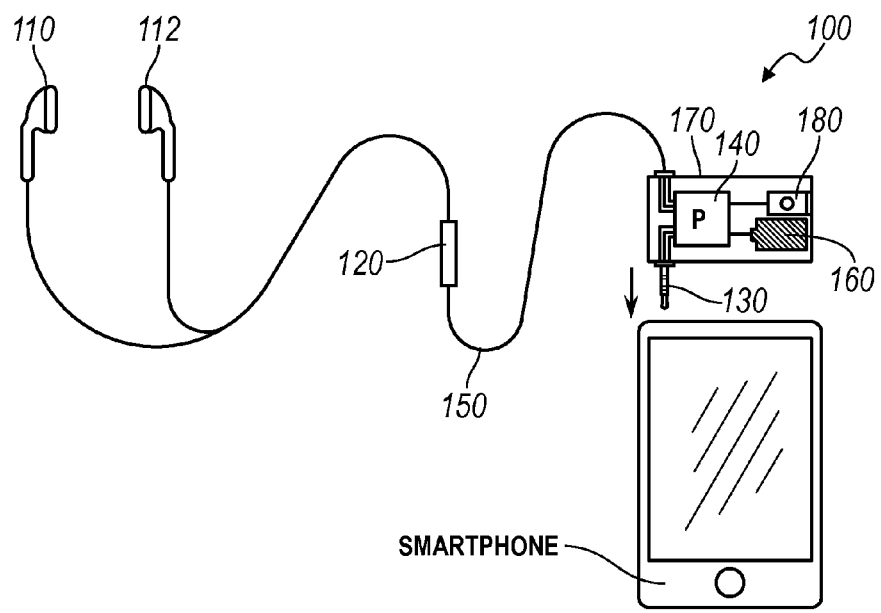
FIG. 2 is a schematic representation of one variation of the smart headphone device.

In another implementation, the battery 160, the processor 140, and the jack 130 are arranged within or on to the same singular housing. In this implementation, the cable 150 extends from the housing 170 and connects to the microphone 120, the left speaker 112, and the right speaker 110. For example, the microphone 120 can be arranged in a second housing arranged on the cable 150 between the housing 170 and the left speaker 112. In this implementation, when the smart headphone device is connected to a computing device (e.g., a smartphone), the housing 170 can rest against an exterior service of the computing device, as shown in FIG. 2.

In yet another implementation, the battery 160 and processor are arranged in a first housing, the microphone 120 is arranged in a second housing, and the jack 130 is coupled to the end of a second cable. However, the processor 140, the cable 150, the jack 130, the microphone 120, and/or the battery 160, etc. can be arranged within or without the housing 170, a second housing, etc. in any other suitable configuration.

Figure 3:
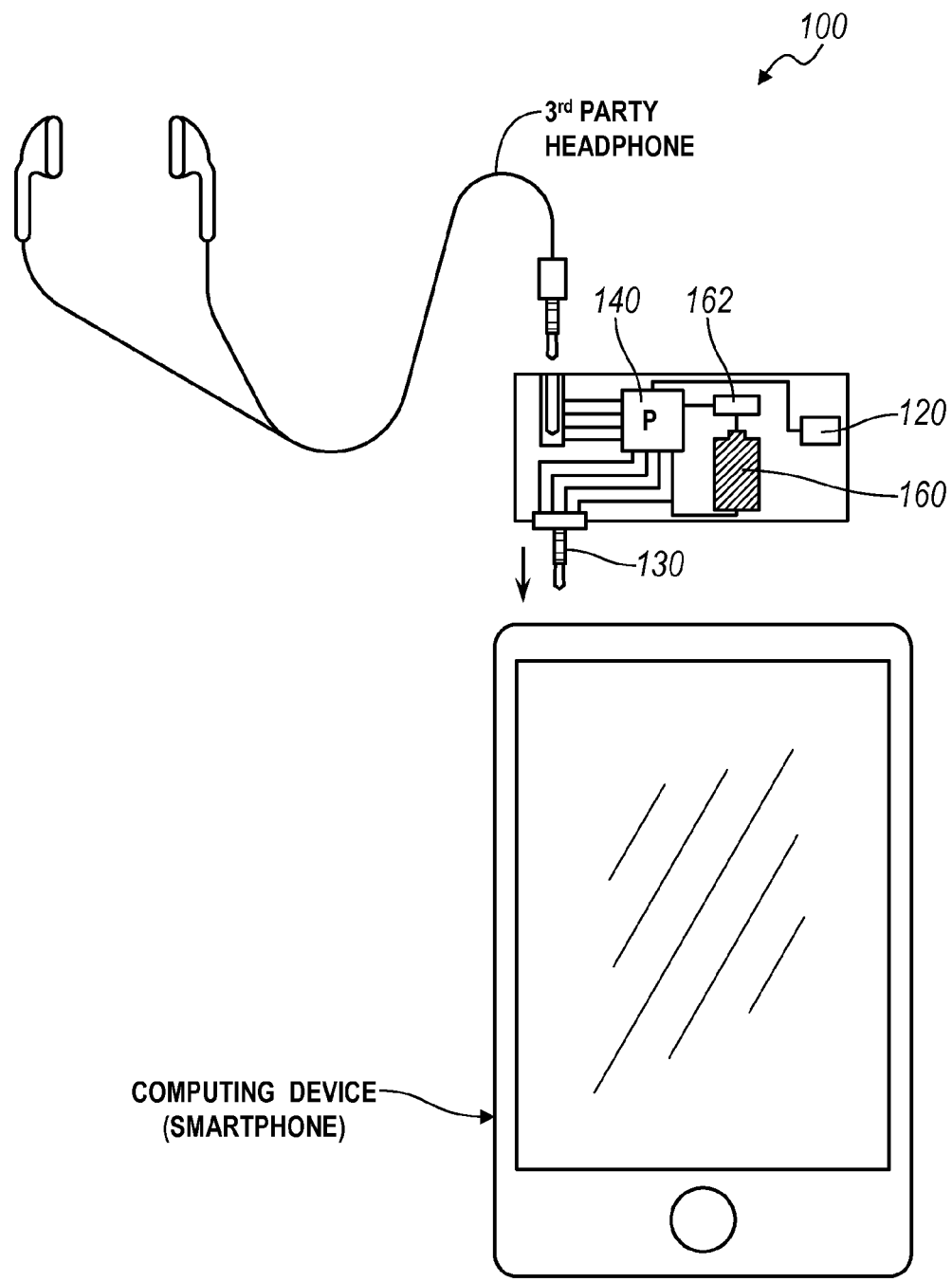
FIG. 3 is a schematic representation of one variation of the smart headphone device.

As shown in FIG. 3, one variation of the smart headphone device excludes the left and right speakers and instead includes a female audio jack. In this variation, the processor 140, the jack 130, and the battery 160 can be arranged within a housing defining a discrete device that "sits" between third party headphones and a computing device (e.g., smartphone) and functions to process an audio signal received over the first and second input pins of the jack 130 and to output the processed audio signal through the female audio jack. In this variation, the smart headphone device can function as a "black box" external audio processor that is both computing device- and audio output device-agnostic, enabling a user to plug the smart headphone device into any computing device or audio playback device and enabling the user to plug any third-party headphone, speaker, etc. into the smart headphone device.

This variation, the processor 140 can implement functionalities described above to modify an audio signal according to the audio output profile. The processor 140 can also modify or adjust (parameters or) the audio output profile based on the type of third-party headphone and/or computing device connected to the smart headphone device. For example, the processor 140 can automatically detect the connected third-party headphones (or other audio output device, as described in U.S. patent application Ser. No. 14/178,034) and adjust the audio output profile accordingly. Alternatively, the user can open a native audio output profile application (or access a native audio output profile website through a web browser) executing on the computing device and select the make and/or model of the connected headphone from a dropdown menu, and the native audio output profile application can adjust the audio output profile according to a sound response associated with the selected audio output device and push the updated audio output profile to the processor 140, such as over the first and/or second input pins of the jack 130.

In this variation, the smart headphone device can also incorporate an internal microphone. In one implementation, the processor 140 defaults to passing an output signal from the internal microphone through the output pin into the computing device. However, the processor 140 can test for an integrated microphone in a connected third-party headphone and, if an integrated microphone is detected, route an output signal from the microphone 120 within the headphone to the output pin of the jack 130—rather than the output signal from the internal microphone. Alternatively, if a third-party headphone with an integrated microphone is detected, the processor 140 can combine audio signals from the internal microphone and from the integrated microphone into a signal audio output signal. Similarly, the processor 140 can toggle an audio output into the connected computing device (e.g., a smartphone) through the output pin of the jack 130 between the internal microphone output signal and the integrated microphone output signal, and a native application executing on the computing device can combine the packets or "snippets" of received audio data into two discrete microphone channels. However, the smart headphone device can be of any other form, incorporate any other suitable component or device, and communicate data and/or audio signals with or between any other computing device and/or third-party headphone in any other suitable way.

In one variation of the smart headphone device, the processor 140 further processes a microphone output signal according to a voice profile of the user. In this variation, the processor 140 can receive a voice profile and apply the voice profile to the microphone 120 output signal through methods and processes similar to those described above for the audio output profile and audio signal(s). In one example, a native application executing on the user's smartphone collects audio signals through a microphone within the smartphone and/or a microphone in a connected device (e.g., in the smart headphone device or in a third-party headphone). In this example, the native application can identify and qualify user's voice in the received audio signals and accordingly generate a voice profile for user. The voice profile can define how the microphone 120 output signal is processed to augment the user's voice, such as to aid other persons in hearing and/or understanding the user during a phone call. For example, the voice profile can define EQ settings to boost some frequencies and attenuate others, a volume setting, and/or an effects setting to be applied to a microphone output signal, such as while the user is talking and/or while a phone call is underway on the smartphone. The native application can also implement machine learning and/or pattern recognition methods to "learn" the user's voice over time and can thus adjust the voice profile accordingly and transmit updated voice profiles to the smart headphone device when pertinent or convenient.

The native application can also apply voice profiles and corresponding ambient noise data, environment data, user activity data, etc. of other users to the user's voice profile to improve a static or dynamic component of the user's voice profile, such as similar to the audio output profile described above.

In this variation, the processor 140 can process output signals from the microphone 120 according to the voice profile and then pass the processed microphone signal to computing device via the output pin of the jack 130, such as during a phone call. For example, a smartphone connected to the smart headphone device can trigger the processor 140 to apply the voice profile to the microphone 120 output signal by transmitting a process command over the first and/or second output pin of the jack 130 when a phone call is received or placed on the smartphone, and the smartphone can trigger the processor 140 to cancel application of the voice profile to the microphone 120 output signal by transmitting a process cancel command over the first and/or second output pin of the jack 130 when the phone call ends. Alternatively, the smart headphone device can include a hard switch or other input mechanism to enable the user to manually turn microphone processing (or a microphone output) on and off.

The voice profile can define static adjustment to the output signal of the microphone 120, or the voice profile can be dynamic, such as based on a detected or known sound response of a room, a location, a time of day, a user action or activity, etc., and the processor 140 can thus apply dynamic changes to the voice profile similar to the audio output profile described above. For example, the processor 140 can apply a first EQ setting to the microphone 120 output signal when the user is on the phone and speaking into the microphone 120 of the device, and the processor 140 can apply a second EQ setting to the microphone 120 output when the user is giving a talk or lecture and using the smart headphone device and the connected computing device to broadcast his voice to a public address system in a lecture hall. In this example, the second EQ setting can also accommodate a known or detected sound response profile of the lecture hall, and the user can access a native application executing on the computing device to manually switch between a phone call setting and a lecture setting, to manually select a type of lecture hall (e.g., 500+ seats, <100 seats, full, empty, long and narrow, wide and shallow, balcony, etc.), or enter other details or make other manual adjustments to the voice profile. Alternatively, the native application can predict the type of lecture hall and modify the voice profile accordingly or access a setting saved by the user, such as if the user commonly lectures in a particular lecture hall. Therefore, the native application can modify and/or implement a voice profile of the user based on the user's location, an environmental condition, and/or a demographic of the user, etc. The processor 140 can alternatively implement similar methods within the smart headphone device directly, such as in response to receiving location data from the connected computing device.

The processor 140 can also implement the voice profile to identify the user's voice in a microphone output signal and attenuate the output signal when the user is speaking or selective attenuate the user's voice within the microphone output signal when the user's voice and one or more other voices or sounds are present in the microphone 120 output signal. For example, the processor 140 can identify voices in the microphone 120, selectively attenuate the user's voice based on the user's voice profile, and boost portions of the output signal corresponding to the other identified voices in order to aid the user in hearing and comprehending conversation(s) around him without overwhelming the user with his own voice. In this example, the processor 140 can feed the modified microphone output signal directly back into the left and right speakers and/or pass the modified microphone output signal to the connected computing device.

Alternatively, the smart headphone device can collect an audio signal through one or more internal microphones and transmit the audio signal to the computing device. The computing device can then implement the voice profile and/or any other foregoing method or technique to process the audio device and then transmit the processed audio signal back to the smart headphone device, wherein the smart headphone device then outputs the processed audio signal substantially in real-time.

However, the smart headphone device can function in any other to modify an audio input signal and/or an audio output signal communicated over the jack 130 between the processor 140 and a connected computing device.

The foregoing systems and methods can be similarly implemented in other audio devices. In one example, the foregoing systems and methods are implemented in a single portable speaker with one or more speakers. In another example, the foregoing systems and methods are implemented in a set of speakers, such as a left and right speaker set or a surround-sound system with left, right, center, and rear speakers. The foregoing systems and methods can also be implemented in a smartphone, a laptop, a tablet, an automobile or other vehicle, or any other suitable device to process and/or output audio.

2. Apparatus and Applications

Figure 4:
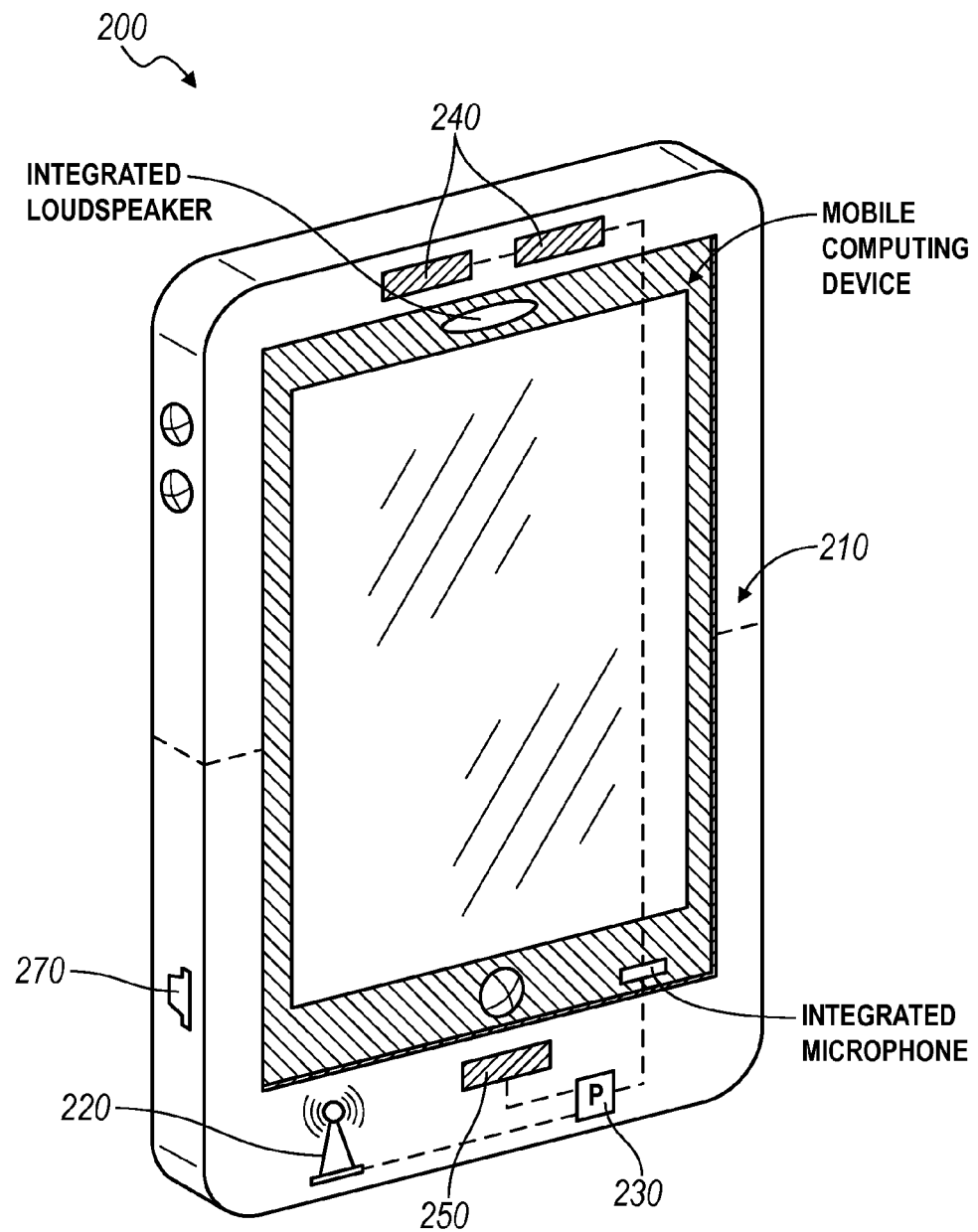
FIG. 4 is a schematic representation of an apparatus in accordance with the invention.

As shown in FIG. 4, an apparatus 200 for augmenting audio capabilities of a mobile computing device is described herein. The mobile computing device can include an integrated loudspeaker proximal a first end of the mobile computing device, an integrated microphone proximal a second end of the mobile computing device opposite the first end, an integrated battery, and an integrated charging port electrically coupled to the battery. The apparatus 200 includes: a housing 210 transiently encasing a portion of the mobile computing device; a communication module 220 arranged within the housing 210, downloading a hearing profile of a user from the mobile computing device, and receiving an output audio signal from the mobile computing device; a processor 230 arranged within the housing 210 and processing the output audio signal according to the hearing profile; a secondary audio output module 240 arranged within the housing 210 adjacent the integrated loudspeaker and outputting a processed form of the output audio signal in place of output of the output audio signal by the integrated loudspeaker; a secondary microphone 250 arranged within the housing 210 adjacent the integrated microphone, the communication module 220 transmitting an input audio signal from the secondary microphone to the mobile computing device; and a secondary charging port 270 arranged within the housing 210, electrically coupled to the integrated charging port, and receiving a charging connector to recharge the mobile computing device through the integrated charging port.

Generally, the apparatus 200 functions as an aftermarket device (transiently) installable on a mobile computing device to augment audio input and output capabilities of the mobile computing device. In particular, the apparatus 200 removes (substantially all) audio output processes from a loudspeaker(s) within the mobile computing device to a loudspeaker(s) within the apparatus 200, removes (substantially all) audio input processes from a microphone(s) within the mobile computing device to a microphone(s) within the apparatus 200, and processes output audio signals locally on the apparatus 200 to compensate for the user's hearing needs and/or ambient noise conditions substantially in real-time before outputting a processed form of the audio output signals through an internal loudspeaker(s) when the apparatus 200 is installed on the mobile computing device. For example, the apparatus 200 can store a hearing profile (e.g., of a user associated with the mobile computing device connected to the apparatus 200) locally and apply the hearing profile to audio output signals received from the mobile computing device such that (substantially) all audio output from the apparatus 200 is customized for the user's personal hearing abilities and disabilities. The apparatus 200 can also store audio output profiles specific to different audio output types (e.g., telephone calls, music, a personal data assistant), applications executing on the mobile computing device (e.g., a native telephone call application, a native maps application, a native music application), and/or a type of peripheral audio device connected to the apparatus 200 (e.g., headphones, a home stereo, a car stereo), etc., and the apparatus 200 can selectively apply one or more such audio output profiles to an audio output signal from the mobile computing device to further compensate for the user's current listening conditions.

The apparatus 200 can similarly processes output audio signals locally on the apparatus 200 to compensate for the user's voice and/or ambient noise conditions substantially in real-time before outputting a processed form of the input audio signals into the mobile computing device when the apparatus 200 is installed there over. For example, the apparatus 200 can apply a voice profile of the user to an input audio signal collected through a microphone within the apparatus 200 during a telephone call supported on the mobile computing device before communicating the processed input audio signal into the mobile computing device in order to improve comprehension of the user's voice for an individual conversing with the user over the telephone call. Similarly, the apparatus 200 can modify the input audio signal during a telephone call to remove ambient noise (e.g., wind noise, traffic noise) from the input audio signal before communicating the processed input audio signal into the mobile computing device during a telephone call supported on the mobile computing device such that an individual on the telephone call with the user perceives that the user is in a quiet(er) space during the telephone call.

The apparatus 200 can be configured for (transient) installation on a smartphone, a mobile phone, a tablet, a personal data assistant (PDA), a laptop computer, a radio, a personal navigation device, a personal media player, a camera, a watch, or any other suitable type of mobile computing device. Because the mobile computing device may output an audio signal and/or receive an input audio signal while simultaneously executing one or more other processes, and because the mobile computing device may prioritize one native process over another—such as by prioritizing a native calendaring application over processing an output audio signal—the mobile computing device may fail to process an output audio signal according to the user's hearing profile and/or may fail to process an output audio signal according to the user's hearing profile with sufficient speed to output a processed form of the output audio signal (e.g., through an integrated loudspeaker or through a loudspeaker in a connected peripheral device) in real-time as perceived by the user. In particular, the apparatus 200 can handle audio processing locally to limit latency of a processed output audio signal provided to the user, such as to less than fifteen milliseconds after real-time when output through an internal loudspeaker within the apparatus 200. Therefore, once connected (e.g., installed over) the mobile computing device, the apparatus 200 can remove audio processing from the mobile computing device and instead process audio locally on a dedicated processor within the apparatus 200, thereby substantially preserving customization of output audio signals (and input audio signals) specifically for the user and in real-time regardless of which processes are executed on the mobile computing device and in what order. Similarly, the apparatus 200 can collect input audio signals—such as ambient noise or the user's voice—through a microphone installed locally in the apparatus 200 rather than retrieving a microphone signal from the mobile computing device to substantially limit a latency between detecting ambient noise proximal the apparatus 200 and processing the input audio signal to compensate for the ambient noise and/or to limit a latency between collecting the input audio signal and processing the input audio signal according to the user's voice profile.

In one example application, the apparatus 200 includes a hard case for a smartphone and installs around a perimeter and back of the smartphone. In this example application, the apparatus 200 includes a male plug that engages a female receptacle within the smartphone to enable (digital and/or analog) communication between the smartphone and the apparatus 200, such as communication of the user's hearing profile to the apparatus 200. The apparatus 200 can additionally or alternatively include a wireless communication module (e.g., a Bluetooth module) over which the apparatus 200 communicates with the smartphone, such as to receive an output audio signal from the smartphone and to transmit an (processed form of an) input audio signal to the smartphone during a telephone call supported on the smartphone. In this example application, once the apparatus 200 is installed on the smartphone, all output audio signals from the mobile computing device (e.g., incoming telephone signals, music) can be directed to the apparatus 200 and played through one or more audio output modules (e.g., a loudspeaker) within the apparatus 200 rather than through a loudspeaker within the smartphone. Similarly, once the apparatus 200 is installed on the smartphone, all input audio signals (e.g., a microphone input) can be collected at the apparatus 200 (and processed) and communicated into the smartphone rather than being collected at the smartphone. Therefore, as in this example application, the apparatus 200 can function to handle (substantially) all audio processing immediately before output to a user and can handle (substantially) all audio collection during operation of the smartphone.

2.2 Housing

Figure 5:
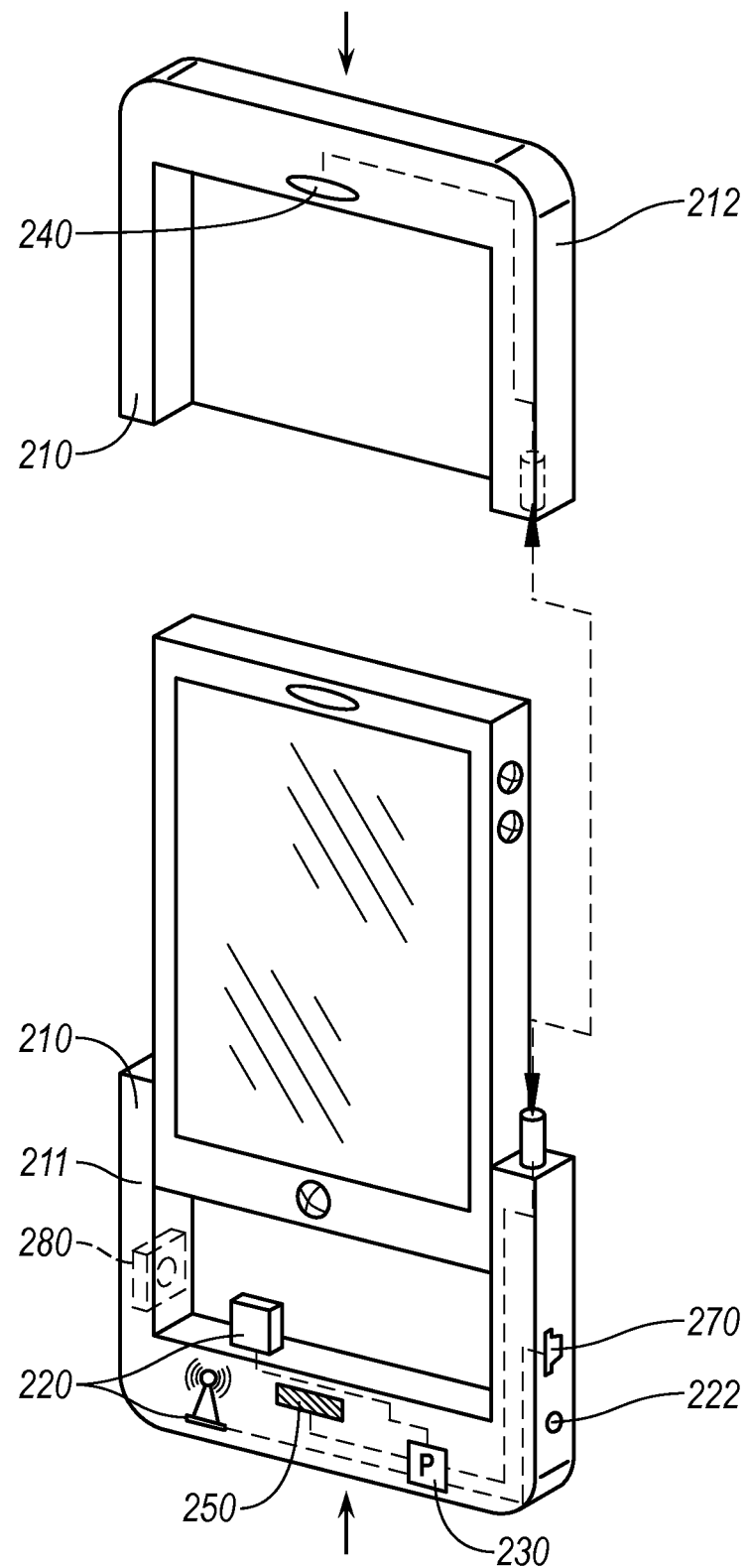
FIG. 5 is a schematic representation of one variation of the apparatus.

The housing 210 of the apparatus 200 transiently encases a portion of the mobile computing device. Generally, the housing 210 defines a removal enclosure that receives a portion of the mobile computing device and contains various other elements of the apparatus 200. For example, the housing 210 can include a first portion 211 and a second portion 212, as shown in FIG. 5; wherein the first portion 211 of the housing 210 contains the communication module 220, the processor 230, and the secondary microphone (hereinafter "the microphone 250"); and wherein the second portion 212 of the housing 210 contains the secondary audio output module (hereinafter "the audio output module 240") and transiently engages the first portion 211 to substantially encase the mobile computing device. Thus, in this example, the housing 210 can include a clamshell of a substantially rigid material(s) that encases the sides and back of the mobile computing device. The first portion 211 and the second portion 212 of the housing 210 can also transiently lock together to form an impact-resistant encasement for the mobile computing device. Alternatively, the housing 210 can be of a flexible and/or elastic material or any other suitable material of any other form.

2.3 Communication Module

The communication module 220 of the apparatus 200 is arranged within the housing 210, downloads a hearing profile of a user from the mobile computing device, and receives an output audio signal from the mobile computing device. Generally, the communication module 220 functions to communicate data—in digital and/or analog format—between the apparatus 200 and the mobile computing device. In particular, the communication module 220 functions to collect the user's hearing profile and audio output-related data from the mobile computing device and to receive an (digital or analog) output audio signal from the mobile computing device; the processor 230 can then apply the user's hearing profile and the audio output-related data to the output audio signal before the output audio signal is broadcast—now in processed form—to the user, such as through the audio output module 240 or through a peripheral audio device coupled to the apparatus 200. For example, the communication module 220 can download or otherwise receive: hearing data of a user (e.g., collected during a hearing test completed by the user); a hearing profile of the user; audio output profiles corresponding to various types of audio, various locations, various connected peripheral audio devices, and/or various audio-related native applications executing on the mobile computing device, etc.; data corresponding to events occurring or detected at the mobile computing device (e.g., native applications opened, GPS or geofenced locations, volume commands, etc.); and/or any other data from the mobile computing device. In particular, the communication module 220 can download: a hearing profile of the user, as described in U.S. patent application Ser. No. 14/178,034; a sound profile corresponding to a particular audio type, as described in U.S. patent application Ser. No. 14/178,067; and/or location data or location-based audio output profiles, as described in U.S. patent application Ser. No. 14/206,499, from the mobile computing device and store any of these data locally on the apparatus 200, such as on in a discrete flash memory module arranged within the apparatus 200 or locally on the processor 230 within the apparatus 200.

In one implementation, the communication module 220 includes a male audio jack plug that engages a female audio jack receptacle integrated into the mobile computing device when the apparatus 200 is installed over the mobile computing device, and the communication module 220 receives both the output audio signal in analog form and the hearing profile of the user, etc. in digital form from the mobile computing device over the female audio jack, as described above. Thus, the communication can receive data in digital and analog form substantially simultaneously over an audio jack integrated into the mobile computing device. In this implementation, the communication module 220 can also communicate an analog microphone—in original or processed form—into the mobile computing device through a pin of the female audio jack receptacle.

In another implementation, the communication module 220 includes a male data port plug that engages a female data port receptacle integrated into the mobile computing device when the apparatus 200 is installed over the mobile computing device, as shown in FIG. 5, and the communication module 220 receives output audio signals, the user hearing profile, audio output profiles, and/or location data, etc. in digital form over one or more data pins in the female data port receptacle. Alternatively, the communication module 220 can receive the output audio signal from the mobile computing device in analog format via an analog pin in the female data port receptacle. In this implementation, the communication module 220 can also communicate an analog or digital microphone signal—in original or processed form—into the mobile computing device through a pin of the female audio jack receptacle.

In yet another implementation, the communication module 220 includes a wireless communication module that communicates with the mobile computing device via a wireless communication protocol, such as Bluetooth, as shown in FIGS. 4 and 5. In this implementation, once the apparatus 200 is installed over the mobile computing device and activated, the wireless communication module can pair with the mobile computing device. For example, the wireless communication module can automatically pair with the mobile computing device in response to a tapping event (e.g., a "double-tap") on the apparatus 200-mobile computing device unit. Alternatively, the wireless communication module can pair with the mobile computing device once the apparatus 200 is installed there over based on the strength of a signal from a corresponding wireless radio within the mobile computing device. As in these examples, the wireless communication module can thus remain paired with the mobile computing device for as long as the apparatus 200 is installed over the mobile computing device. Once paired with the mobile computing device, the wireless communication module can download the hearing profile, audio output profiles, and/or location data, etc. in digital format from the mobile computing device. In this implementation, the wireless communication module can also transmit a (raw or processed) input audio signal from the microphone 250 to the mobile computing device over wireless communication protocol. Similarly, the wireless communication module can transmit the processed form of the output audio signal from the apparatus 200 to a connected peripheral audio device, such as a Bluetooth headset or a pair of Bluetooth-enabled headphones also paired to the apparatus 200. However, the communication module 220 can communicate with the mobile computing device in any other way and over any other wired or wireless communication protocol.

The communication module 220 can also support any combination of wired and/or wireless communication protocols with the mobile computing device, such as in different operating modes of the apparatus 200 and/or of the mobile computing device. In one example, the communication module 220 includes a wireless receiver (e.g., a Bluetooth transceiver) and a wired receiver (e.g., a male data port plug), the wireless receiver receives a first output audio signal from the mobile computing device in a first mode, and the wired receiver receives a second output audio signal from the mobile computing device through an integrated data port in the mobile computing device in a second mode. In this example, the processor 230 can processes the first output audio signal according to a first hearing profile of the user in the first mode, such as during a telephone call, and then process the second output audio signal according to a second hearing profile of the user in the second mode, such as during music playback through the mobile computing device. During the first mode in which a telephone call involving the mobile computing device is underway, the processor 230 can also process an input audio signal from the microphone 250 according to a voice profile of the user, as described above, and the communication module 220 can then wirelessly transmit the processed form of the input audio signal to the mobile computing device substantially in real-time while also receiving the first output audio signal from the mobile computing device. Thus, the communication module 220 can include multiple communication subcomponents supporting multiple wired and/or wireless communication protocols, and the communication module 220 can select between the communication subcomponents to download and/or upload data between the apparatus 200 and the mobile computing device during various modes of the apparatus 200, such as modes specific to audio processing of incoming or outgoing audio data during telephone calls, specific to music playback, specific to intelligent personal assistant commands and responses, specific to voice navigation prompts, etc.

2.4 Microphone

The microphone 250 is arranged within the housing 210 adjacent the integrated microphone. Generally, the microphone 250 is arranged within the apparatus 200 such that the microphone 250 is adjacent a microphone integrated into the mobile computing device with the housing 210 is installed thereover. The microphone 250 functions to replicate the functionality of the integrated microphone but routes input audio data to the processor 230 within the apparatus 200 to enable the processor 230 to detect an ambient noise condition from the input audio signal substantially in real-time and/or to enable the processor to process the input audio signal to compensate for ambient noise before transmission into the computing device substantially in real-time. The microphone 250 can therefore output a (analog or digital) signal corresponding to local noise, such as ambient noise or the user's voice proximal the microphone 250, and to enable the processor to access this input audio signal.

The apparatus 200 can also include multiple microphones, such as a first microphone 250 and a second microphone arranged within the housing 210, and the processor can analyze outputs from the first and second microphones to distinguish ambient sounds originating near the user from ambient sounds originating further away from the user, to determine the former to be relevant noise and the latter to be background noise, boost the relevant noise and attenuate the background noise in signals from the first and second microphones, and combine the processor signals from the first and second microphones before outputting the processed audio signal through the secondary audio output module substantially in real-time to aid the user in audibly discerning local relevant sounds from background noise. The microphone 250 can further be arranged near an end of the housing to place the microphone substantially proximal a user's mouth when the mobile computing device-apparatus assembly is in use as a cellular phone.

However, the apparatus 200 can include any other number of microphones arranged in any other way within the housing 210, such as two microphones supported within the housing 210 in a stereo configuration.

2.5 Processor

The processor 230 of the apparatus 200 is arranged within the housing 210 and processes the output audio signal according to the hearing profile. Generally, the processor 230 functions to process output audio signal—received from the mobile computing device—according to user, device, and/or ambient parameters before outputting a processed form of the output audio signal to the user through an internal or external audio output module (e.g., loudspeaker). The processor 230 can similarly process input audio signal—from the microphone 250—according to user, device, and/or ambient parameters before outputting a processed form of the input output audio signal to the mobile computing device via the communication module 220. The processor 230 can further handle ambient noise detection, battery monitoring, hearing profile generation and/or selection, and/or audio output device detection and corresponding audio output profile selection, etc.

In one implementation, the processor 230 generates the user's hearing profile from hearing test results received from the mobile computing device over the communication module 220. For example, the communication module 220 can receive results of a hearing test completed by the user through a native hearing test application executed on the mobile computing device, and processor can manipulate these data to generate a hearing profile specific to the user, such as including actual and/or estimated abilities of the user to hear at discrete audible frequencies or over various audible frequency ranges, such as described in U.S. patent application Ser. No. 14/178,034. Alternatively, the processor 230 can collect a hearing profile of the user from the mobile computing device. For example, the hearing profile can be generated locally on the mobile computing device or generated remotely on a remote server and uploaded to the mobile computing device, and the communication module 220 can download the hearing profile from the mobile computing device and store the hearing profile locally in memory within the apparatus 200; the processor 230 can then access the hearing profile to process output audio signals subsequently received from the mobile computing device. The communication module 220 can also download new hearing profiles of the user as such new hearing profiles become available, such as after the user completes a hearing test on a native hearing test application executing on the mobile computing device (e.g., once per six-month period), such as when the user indicates (through the mobile computing device) that the current hearing profile stored on the apparatus 200 is no longer sufficient, or such as when a different user assumes use of the apparatus 200 and/or the apparatus 200-mobile computing device unit.

The processor 230 can then apply the received or locally-generated hearing profile of the user to the output audio signal received from the mobile computing device to process the output audio signal substantially in real-time before outputting the processed form of the output audio signal through the audio output device arranged in the apparatus 200 and/or through a connected peripheral audio device. For example, the processor 230 can boost a particular frequency or a particular range of frequencies to compensate for the user's difficulty in hearing this particular frequency or particular range of frequencies, as specified in the user's hearing profile. Similarly, the processor 230 can attenuate another particular frequency or another particular range of frequencies to compensate for the user's sensitivity to this other particular frequency or other particular range of frequencies, as specified in the user's hearing profile, such as described in U.S. patent application Ser. No. 14/178,034.

The processor 230 can also apply location-based audio output profiles to the audio output signal to compensate for known ambient noise conditions and/or known sound responses of a particular location. For example, a native application executing on the mobile computing device can interface with a location module within the mobile computing device, such as a GPS sensor or a Wi-Fi module, to detect a location of the mobile computing device and to select a particular audio output profile corresponding to the detected location. In this example, the native application can select the particular audio output profile from a local database of locations and corresponding audio output profiles generated on the mobile computing device from location and audio data previously collected on mobile computing device. Alternatively, the native application can select the particular audio output profile from a remote database of locations and corresponding audio output profiles, such as generated from location and audio data previously collected by multiple mobile computing devices, such as through similar native applications executing on a multiple of similar mobile computing devices. The native application executing on the mobile computing device can then upload the particular location-based audio output profile to the apparatus 200 via the communication module 220, and the processor 230 can modify the audio output signal according to the particular location-based audio output profile, such as by attenuating and/or boosting particular frequencies of the output audio signal to compensate for common noise levels at the location and/or a local frequency response at the location. In this example, the native application can also elect the particular location-based audio output profile based on a time of day, a proximity of other mobile computing devices executing a similar native application to the mobile computing device, and/or previous (e.g., recent) audio-related inputs entered into neighboring mobile computing devices, etc., as described in U.S. patent application Ser. No. 14/178,067. Alternatively, the apparatus 200 can store various location-based audio output profiles locally, and the processor 230 can elect a particular location-based audio output profile based on location data received from the mobile computing device. For example, the communication module 220 can receive a location datum from the mobile computing device, and the processor 230 can select a particular audio output profile, from a set of audio output profiles stored locally in memory arranged within the housing 210, based on the location datum. In this example, the processor 230 can then process the output audio signal according to both the user's hearing profile and the particular audio output profile elected for the current location of the apparatus 200-mobile computing device unit. Yet alternatively, the apparatus 200 can further include a location module (e.g., a GPS sensor), and the processor 230 can elect the particular location-based audio output profile based on an output of the internal location module. However, the processor 230 can function in any other way to apply location-related audio parameters to the output audio signal received from the mobile computing device.

The processor 230 can additionally or alternatively detect real-time ambient noise conditions proximal the mobile computing device and modify the output audio signal to improve the user's listening experience. In particular, the processor 230 can morph the output audio signal into a more audibly-discernible form by boosting and/or attenuating particular frequencies and/or particular frequency ranges of the output audio signal in real-time in response to detected changes ambient noise conditions proximal the mobile computing device. In one example, the processor 230 samples an output of the microphone 250 within the apparatus 200—such as continuously (e.g., at a sampling rate of 20 Hz) while the apparatus 200 is in use or intermittently (e.g., for a five second interval during every minute of user of the apparatus 200)—and characterizes an ambient noise condition proximal the mobile computing device based on the output of the microphone 250. In this example, the processor 230 can characterize an input audio signal from the microphone 250 as one of crowd noise, crowd noise in an open space (e.g., an amphitheatre), crowd noise in a confined space (e.g., a restaurant), road noise, street noise, machine noise, rain, thunder, and/or hail, ocean waves, the user's voice, a single or low number of voices, music, etc.; the processor 230 can then elect a particular audio output profile correspond to the characterization of the input audio signal (e.g., an audio output profile for crowd noise in a confined space) and then apply the elected audio output profile to the output audio signal to modify the output audio signal accordingly before output to the user through an audio output module within the apparatus 200 or within a peripheral audio device connected thereto. Alternatively, the processor 230 can characterize an amplitude of the ambient noise at particular frequencies or particular frequency ranges and directly boost corresponding frequencies or frequency ranges in the output audio signal substantially in real-time according to frequency-specific amplitudes of the noise, thereby compensating for the ambient noise and enabling the user to hear substantially all frequencies of the output audio signal, even frequencies of the output audio signal coincident the ambient noise. In this example, the processor 230 can also apply a sound response profile of the microphone 250 within the apparatus 200 to normalize the input audio signal for real noise levels proximal the mobile computing device.

In the foregoing implementation, the processor 230 can continuously sample the microphone 250 (e.g., at a rate of 20 Hz, for a period of five seconds per minute) and then modify the output audio signal (or an audio output profile applied to the output audio signal) substantially in real-time based on each new audio sample received from the microphone 250. The processor 230 can also collect ambient noise data from the microphone 250 over a time interval (e.g., one minute), average these ambient noise data over the time interval to update or generate an audio output profile, and then apply the audio output profile to the output audio signal, such as upon conclusion of the corresponding time interval. The processor 230 can also sample the microphone 250 and update the profile applied to the output audio signal to compensate for ambient noise only when conditions of the apparatus 200-mobile computing device unit are suitable (e.g., when particular conditions are met). For example, the apparatus 200 can further include an accelerometer arranged within the housing 210, and the processor can sample the accelerometer to determine if the mobile computing device is accelerating (and/or a magnitude and direction of the acceleration). Thus, the processor 230 can only sample the microphone 250 and modify the audio output profile applied to the output audio signal when the apparatus 200 is not accelerating (aside from acceleration due to gravity) or is accelerating at a rate less than a threshold magnitude. In particular, the processor 230 can restrict updates to the audio output profile applied to the output audio signal—to compensate for ambient noise—to periods during which the apparatus 200-mobile computing device unit is substantially static. In this example, the processor 230 can thus reduce or eliminate inadvertent compensation for pocket noise—which is not characteristic of true ambient noise conditions around the user—collected through the microphone 250 in the apparatus 200 when the apparatus 200-mobile computing device unit is carried in the user's pocket (or purse, etc.) while the user is walking, running, or moving in any other way. Rather, the processor 230 can apply ambient noise to the output audio signal only when an input audio signal from the microphone 250 is characteristic of true ambient noise conditions around the user, such as when the user is not moving, when the user is moving minimally, and/or when the apparatus 200-mobile computing device unit is not carried in a pocket, purse, etc. The processor 230 can therefore calculate an acceleration of the mobile computing device based on an output of the accelerometer, withhold application of an ambient audio signal from the secondary microphone to the output audio signal in response to the acceleration exceeding a threshold acceleration, and process the output audio signal according to the hearing profile with compensation for the ambient audio signal in response to the acceleration falling below the threshold acceleration, such as for a threshold period of time. The processor 230 can additionally or alternatively execute sound recognition techniques to correlate an input audio signal from the microphone 250 with pocket noise, and the processor 230 can thus reject the input audio signal for application to the output audio signal to compensate for ambient noise conditions until the pocket noise in the input audio signal drops below a threshold amplitude and/or is substantially eliminated from the input audio signal. The processor 230 can also receive the input audio signal from a microphone arranged in a connected peripheral audio device, such as a microphone integrated into a headset or into a pair of headphones coupled to the apparatus 200 via an analog audio input jack. However, the processor 230 can receive an input audio signal in any other format and can function in any other way to process the output audio signal to compensate for ambient noise detected in the input audio signal.

The processor 230 can include an audio codec, a controls processor, and/or any other one or more discrete processing modules that handle particular subroutines or sub-processes of or within the apparatus 200. For example, the processor 230 can include the audio codec that processes the output audio signal according to the user's hearing profile, and the controls processor can handle audio output profile selection, user hearing profile generation, ambient noise detection or characterization from an input audio signal, etc. Therefore, the audio codec and the controls processor can function independently and/or cooperate to execute various functions of the apparatus 200 as described herein.

The processor 230 and the communication module 220 can also be physically coextensive. The processor 230 and the communication module 220 can further define various discrete subcomponents, such as a wireless transmitter module, a wireless receive module, a wired (e.g., I2C) communication module, an audio codec, and/or a controls processor, etc.

2.6 Audio Output Module

The audio output module 240 of the apparatus 200 is arranged within the housing 210 adjacent the integrated loudspeaker and outputs a processed form of the output audio signal in place of output of the output audio signal by the integrated loudspeaker. Generally, the audio output module 240 functions to output a processed form of the audio output signal—to be audibly discerned by the user—proximal a region of the apparatus 200 adjacent an audio output module (e.g., loudspeaker) integrated into the connected mobile computing device, the audio output module 240 of the apparatus 200 thus replacing and replicating the functionality of the audio output module 240 integrated into the mobile computing device. In particular, the audio output module 240 of the apparatus 200 audibly outputs the processed form of the output audio signal (processed to compensate for the user's hearing abilities, ambient noise conditions, etc.) substantially directly from the processor 230 such that audio output is substantially real-time rather than transmitting the processed form of the output audio signal back into the mobile computing device, which may delay audible output of the output audio signal through the integrated audio output module, such as due to processing priorities of the mobile computing device.

In one implementation, the audio output module 240 includes one or more loudspeakers arranged within a portion of the housing 210 (e.g., the second position of the housing 210) adjacent the integrated audio output module of the mobile computing device when the housing 210 is installed over the mobile computing device. The audio output module 240 can thus output the processed form of the output audio signal at various volumes levels audibly detectable by the user near the apparatus 200. The audio output module 240 can additionally or alternatively include an audio receiver that outputs the processed form of the output audio signal that is audibly discernible to the user when the user holds the apparatus 200-mobile computing device unit to his face with the audio receiver adjacent his ear. The audio output module 240 can yet additionally or alternatively include a remote loudspeaker, and the housing 210 can define an internal megaphone profile that amplifies sound output from the remote loudspeaker. In another implementation, the audio output module 240 within the apparatus includes an audio induction loop adjacent the integrated loudspeaker and broadcasting a magnetic field corresponding to the processed form of the output audio signal. In this implementation, the audio induction loop can transmit a magnetic signal based on the processed form of the output audio signal and detectable by a hearing aid proximal the apparatus 200, and the hearing aid can locally translate the magnetic signal into an audibly-discernible signal. However, the audio output module 240 can include any other one or more devices of any one or more types suitable for outputting an audio signal to the user.

Figure 7:
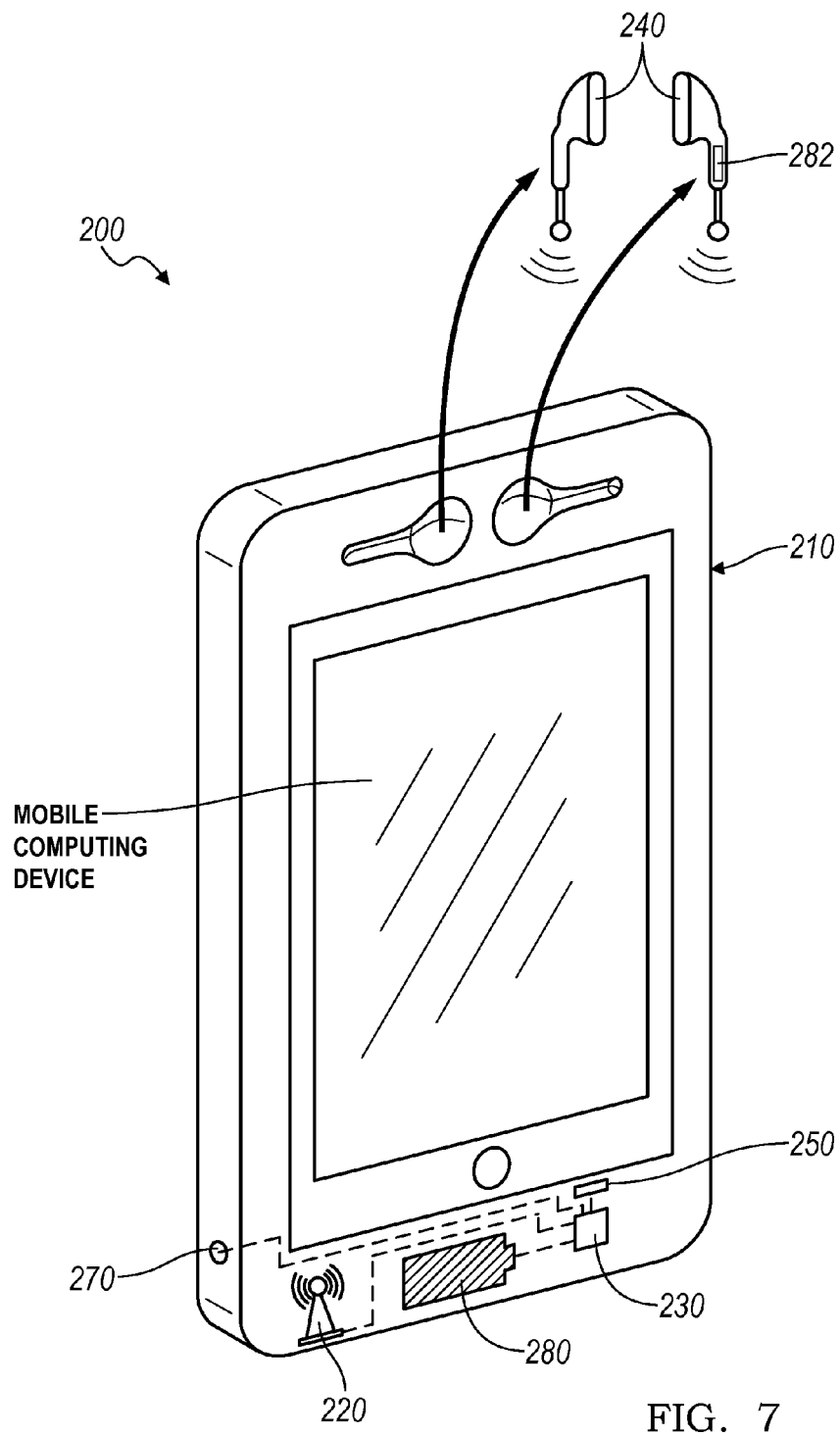
FIG. 7 is a schematic representation of one variation of the apparatus.

The audio output module 240 can be intransiently (e.g., substantially permanently) integrated into the housing 210. The audio output module 240 can additionally or alternatively include one or more loudspeakers, audio receivers, and/or audio induction loops, etc. that are transiently arranged within (the second portion 212 of) the housing 210. In one example implementation, the audio output module 240 can include a loudspeaker removably connected to the housing 210 via a wire and receiving the processed form of the output audio signal from the processor 230 via the wire. For example, the loudspeaker can be arranged within an earbud that can be transiently installed into a receiver defined in the housing 210 in a "speakerphone mode," and the earbud can default to outputting sound though the loudspeaker at a first default volume in the speakerphone mode. However, the earbud can then be removed from the housing 210 and placed in the user's ear in a "private playback mode," and the earbud can default to outputting sound though the loudspeaker at a second default volume—less than the first default volume—in the private playback mode. Similarly, the audio output module 24 can include a loudspeaker that wirelessly pairs with a wireless communication component of the communication module 220 and that receives the processed form of the output audio signal wirelessly from the communication module 220 before outputting the same. For example, the audio output module 240 can include a wireless-enabled earbud that receives the processed form of the output audio signal via wired or wireless communication protocol when installed in the housing 210 and that receives the processed form of the output audio signal over wireless (e.g., Bluetooth) communication protocol when removed from the housing 210 (and installed in the user's ear), as shown in FIG. 7. In this example, the secondary audio output module can include a discrete housing that contains a tertiary battery 282 and the loudspeaker, and a secondary battery 280 (described below) arranged within the housing 210 can charge the tertiary battery 282 of the secondary audio output module when the secondary audio output module is installed back into the housing, such as through a pair of prongs in the discrete housing of the secondary audio output module that engage a matching pair of prongs within the housing 210. However, the audio output module 240 can include any other one or more audio output devices transiently or intransiently coupled to the housing 210 of the apparatus 200 and receiving the processed form of the output audio signal over any other suitable communication protocol.

As shown in FIG. 5, one variation of the apparatus 200 further includes an audio jack 222 arranged within the housing 210, the processor 230 selectively routing the processed form of the output audio signal from the secondary audio output module to the audio jack 222 in response to connection of a peripheral audio device to the audio jack 222. Generally, the audio jack 222 functions to route the processed form of the output audio signal to a connected peripheral audio device (e.g., a headset, a pair of headphones, a car stereo, a home stereo, etc.) for playback to the user. In this variation, the processor 230 can further predict a type of the peripheral audio device connected to the audio jack 222, such as based on an impedance of the peripheral audio device connected to the apparatus 200 via the audio jack 222, and the processor 230 can thus process the output audio signal according to an audio output profile corresponding to the type of the peripheral audio device. For example, the processor 230 can apply a headphone audio output profile to the output audio signal—in conjunction with the user's hearing profile, a location-based audio profile, etc.—if an impedance across the audio jack 222 falls within an impedance range corresponding to headphones, and the processor 230 can apply a car stereo audio output profile to the output audio signal if an impedance across the audio jack 222 falls within an impedance range corresponding to car stereos and different from impedance range corresponding to headphones.

2.7 Battery and Charging Port

The secondary charging port (hereinafter the "charging port") of the apparatus 200 is arranged within the housing 210, is electrically coupled to the integrated charging port, and receives a charging connector to recharge the mobile computing device through the integrated charging port. Generally, the charging port 270 is arranged within the housing 210, receives a charging connector, and distributes power from the charging connector into the mobile computing device to charge the mobile computing device. Therefore, the charging port 270 can function as a via passing from a perimeter of the housing 210 of the apparatus 200 into the mobile computing device to enable the mobile computing device to be charged with the apparatus 200 in place over the mobile computing device.

As shown in FIG. 5, one variation of the apparatus 200 includes a secondary battery 280 (hereinafter the "battery 280") arranged within the housing 210 and powering the processor 230 and the audio output module 240, the charging port 270 electrically coupled to the battery 280 and receiving the charging connector to recharge the battery 280. Generally, the battery 280 functions to supply (electrical) power to various components of the apparatus 200 during operation thereof. In this variation, the battery 280 can also siphon power from the charging port 270 when a charging connector is installed therein, the battery 280 thus charging substantially simultaneously with the mobile computing device and via the same charging connector.

In one implementation, the processor 230 selectively diverts electrical power—received from the charging connector through the charging port 270 of the apparatus 200—between the charging port 270 integrated in the mobile computing device and the battery 280 in the apparatus 200 to simultaneously charge the battery 280 in the apparatus 200 and the battery integrated into the mobile computing device. For example, the processor 230 can selectively divert electrical power between the secondary battery 280 and the integrated battery, via the integrated charging port, to maintain the secondary battery 280 and the integrated battery in substantially similar states of charge. In this example, the processor 230 can couple to a high voltage, high current line in the mobile computing device—such as via a wired connector of the communicate module—to directly read a voltage of the battery within the mobile computing device; the processor 230 can then control a charging circuitry within the apparatus 200 to match the voltage (indicative of a stage of charge) of the battery 280 within the apparatus 200 to the voltage of the battery within the mobile computing device. Alternatively, the processor 230 can routinely request a stage of charge of the integrated battery from mobile computing device, such as over the wireless or wired digital communication protocol supported by the communication module 220, and the apparatus 200 can selectively divert or partition power received from the charging connector, via the charging port 270, between the battery 280 within the apparatus 200 and the battery within the mobile computing device accordingly.

In the foregoing implementation, the processor 230 can therefore selectively divert or partition power from the charging connector to the battery 280 in the apparatus 200 and the battery in the mobile computing device to match states of charge and/or to match a battery life (in time until fully discharged) of the batteries. The processor 230 can also selectively divert power from the battery 280 in the apparatus 200 to the battery in the mobile computing device, such as via a data port of the communication module 220, to maintain similar states of charge and/or battery life of the battery 280 in the apparatus 200 and the battery in the mobile computing device during operation of the apparatus 200-mobile computing device unit. By maintaining the states of charge of the batteries in unison until full discharge, the processor 230 can substantially prevent a scenario in which the battery 280 within the apparatus 200 retains a charge while the battery within the mobile computing device is fully discharged, the apparatus 200 thus not useful in customizing audio output from the mobile computing device as the mobile computing device has shut down. Similarly, the processor 230 can thus substantially prevent a scenario in which the battery within the mobile computing device retains a charge while the battery 280 within the apparatus 200 is fully discharged, the apparatus 200 thus no longer able to customize audio output from the mobile computing device because it has shut down, and the apparatus 200 possibly obscuring audio output from a loudspeaker in the mobile computing device and requiring removal from the mobile computing device to enable audio functionality of the mobile computing device.

Yet alternatively, the processor 230 can selectively divert power from the battery 280 in the apparatus 200 to the battery in the mobile computing device during operation thereof to extend a battery life of the mobile computing device even when the apparatus 200 has powered down. The processor 230 can also selectively divert or portion power from a charging connector engaged in the charging port 270 to preferentially charge the battery within the mobile computing device. For example, the processor 230 can initially divert 80% of power from the charging connector into the mobile computing device and 20% of power from the charging connector into the battery 280 in the apparatus 200 and then divert 100% of power from the charging connector to the battery 280 within the apparatus 200 once the battery within the mobile computing device is fully charged. However, the processor 230 can implement any other charging schedule, power distribution schema, etc. to charge and maintain the battery 280 in the apparatus 200 and the battery in the mobile computing device. Alternatively, a native application executing in the mobile computing device can implement any of these methods or techniques to charge and maintain the battery 280 in the apparatus 200 and the battery in the mobile computing device.

2.8 Methods

The apparatus 200 can further implement various methods or techniques to handle various output audio types supported on the mobile computing device and to switch therebetween.

Figure 6:
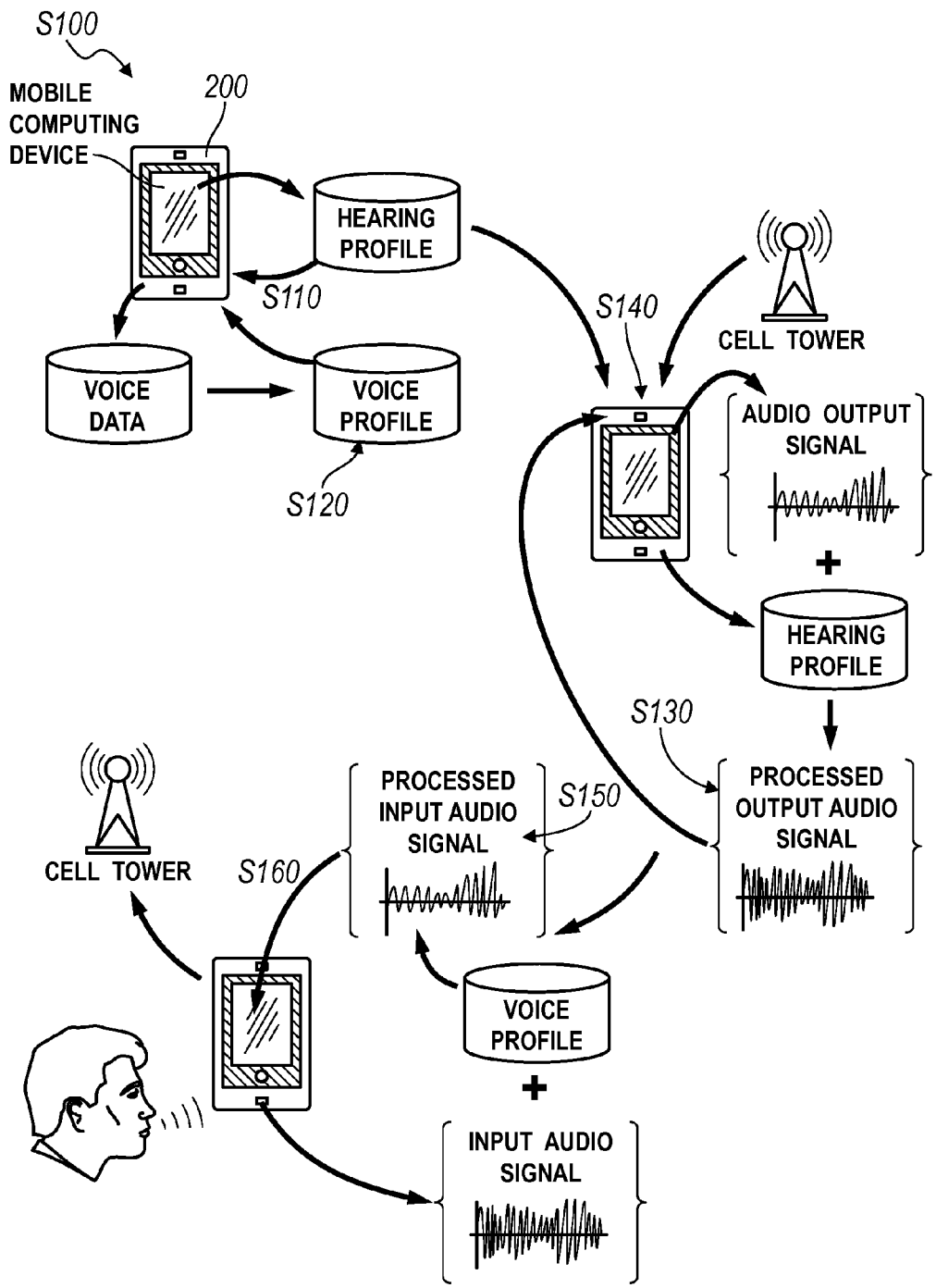
FIG. 6 is a flowchart representation of a method in accordance with the invention.

As shown in FIG. 6, in one implementation, the apparatus 200 executes a method for augmenting audio capabilities of a mobile computing device, including: at a peripheral device (i.e., the apparatus 200), receiving a hearing profile of a user from a computing device coupled to the peripheral device in Block S110; and generating a voice profile of the user based on audio data collected through a microphone coupled to the peripheral device in Block S120. The method can further include, during a telephone call established with the computing device: at the peripheral device, processing an output audio signal according to the hearing profile of the user, the output audio signal received from the computing device in Block S130; outputting a processed form of the output audio signal through an audio output module coupled to the peripheral device in Block S140; processing an input audio signal from the microphone 250 according to the voice profile of the user in Block S150; and transmitting a processed form of the input audio signal to the computing device in Block S160.

Generally, the apparatus 200 can execute the method to switch between communication protocols for communications between the apparatus 200 and the connected mobile computing device based on a type of the output audio signal. In particular, the apparatus 200 can implement the method to communicate input (e.g., microphone) and output (e.g., incoming call) audio data between the apparatus 200 and the mobile computing device over one submodule of the communication module 220 during a telephone call engaged through the mobile computing device and to receive audio data for other audio types (e.g., voice navigation, prerecorded audio playback, alarms) over a second submodule of the communication module 220. For example, as described above, the apparatus 200 can implement the method locally on the apparatus 200 to receive an output audio signal from the mobile computing device and to transmit a processed form of the input audio signal (from the microphone 250 within the apparatus 200) over Bluetooth (or other) wireless communication protocol while a telephone call is ongoing on the mobile computing device, and the apparatus 200 can receive an output audio signal from the mobile computing device over a wired connection to the mobile computing device (e.g., over a data port of the mobile computing device) as other audio-related functions are executed on the mobile computing device. The apparatus 200 can also apply a voice profile of the user to the input audio signal from the microphone 250 and transmit this processed input audio signal to the mobile computing device substantially in real-time during a telephone call but switch to extracting ambient noise conditions from the input audio signal from the microphone 250 and processing the output audio signal according, as described above, during other audio playback functions of the mobile computing device.

In one implementation, the processor 230 within the apparatus 200 collects user voice data from the microphone 250 over time and generates a voice profile characterizing the user's voice according. For example, the voice profile can define an overall loudness level of the user's voice (i.e., an average audible amplitude of the user's voice across the audible range and/or over time), a common vocal range of the user, frequencies or ranges of frequencies over which the amplitude of the user's voice increases or decreases, and/or a tonality or timbre of the user's voice, etc. Alternatively, such as voice profile can be generated locally on the mobile computing device or remotely, such as on a remote server, and the apparatus 200 can download the voice profile from the mobile computing device. During a telephone call (or other mobile computing device function handling audio input), the processor 230 can thus process an input audio signal from the microphone 250 within the apparatus 200 to improve comprehension of the user's words by another individual, such as during a telephone call or voice recording, and/or to improve comprehension of the user's voice by voice recognition software executing on the mobile computing device or connected computer network. For example, if the user often speaks quietly, the processor 230 can apply the user's voice profile to automatically boost the amplitude of the input audio signal uniformly across the audible range to compensate for the user's soft voice. In another, if the user's voice typically falls within a limited frequency band of 90 Hz to 170 Hz, as specified in the user's voice profile, the processor 230 can process the input audio signal from the microphone 250 during a phone call on the mobile computing device by attenuating frequencies outside of this band and boosting frequencies within the band before transmitting the processed form of the input audio signal from the apparatus 200 into the mobile computing device (substantially in real-time). However, the apparatus 200 can execute the method to process the input audio signal in any other way.

The processor 230 can continuously process the input audio signal according to user's voice profile during operation of the apparatus 200-mobile computing device unit and thus continuously pass the processed input audio signal into the mobile computing device. Alternatively, the processor 230 can selectively process the input audio signal according to user's voice profile, such as in response to receiving a command for the input audio signal from the mobile computing device (e.g., via the communication module 220 within the apparatus 200). Yet alternatively, the processor 230 can selectively process the input audio signal according to user's voice profile according to a type of communication protocol over which the input audio signal is received. For example, the processor 230 can process the input audio signal according to the user's voice profile and communicate the processed input audio signal to the mobile computing device only when an output audio signal is received from the mobile computing device over wireless (e.g., Bluetooth) communication protocol.

The apparatus 200 can implement similar methods or techniques to select between particular hearing profiles and/or audio output profiles with which an output audio signal is processed before being output to the user via the audio output module 24o within the apparatus 200. For example, the apparatus 200 can apply a first hearing profile of the user specific to telephone calls when a telephone call is in process on the mobile computing device (e.g., as indicated by the audio output signal that is received over wireless communication protocol), and the apparatus 200 can apply a second hearing profile of the user otherwise. However, the apparatus 200 can apply any other number and type of hearing and/or audio output profiles the output audio signal (substantially in real-time) and in any other suitable way.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. An apparatus for augmenting audio capabilities of a mobile computing device, the mobile computing device comprising an integrated loudspeaker proximal a first end of the mobile computing device, an integrated microphone proximal a second end of the mobile computing device opposite the first end, an integrated battery, and an integrated charging port electrically coupled to the battery, the apparatus comprising:
a housing transiently encasing a portion of the mobile computing device;
a communication module arranged within the housing, downloading a hearing profile of a user from the mobile computing device, and receiving an output audio signal from the mobile computing device;
a processor arranged within the housing and processing the output audio signal according to the hearing profile;
a secondary audio output module arranged within the housing adjacent the integrated loudspeaker and outputting a processed form of the output audio signal in place of output of the output audio signal by the integrated loudspeaker;
a secondary microphone arranged within the housing adjacent the integrated microphone, the communication module transmitting an input audio signal from the secondary microphone to the mobile computing device; and
a secondary charging port arranged within the housing, electrically coupled to the integrated charging port, and receiving a charging connector to recharge the mobile computing device through the integrated charging port.

2. The apparatus of claim 1, wherein the housing comprises a first portion and a second portion; the first portion of the housing containing the communication module, the processor, and the secondary microphone; the second portion of the housing containing the secondary audio output module and transiently engaging the first portion to substantially encase the mobile computing device.

3. The apparatus of claim 2, wherein a portion of the secondary audio output module is transiently arranged within the second portion of the housing, the communication module wireless transmitting the processed form of the output audio signal to the portion of the secondary audio output module in response to removal of the portion of the secondary audio output module from the second portion of the housing.

4. The apparatus of claim 3, further comprising a secondary battery arranged within the housing, and wherein the secondary audio output module comprises a tertiary battery, the secondary battery charging the tertiary battery 282 in response to installation of the secondary audio output module into the housing.

5. The apparatus of claim 1, wherein the communication module comprises a wireless receiver and a wired receiver, the wireless receiver receiving a first output audio signal from the mobile computing device in a first mode, and the wired receiver receiving a second output audio signal from the mobile computing device through an integrated data port in the mobile computing device in a second mode.

6. The apparatus of claim 5, wherein the communication module downloads a first hearing profile of the user, a second hearing profile of the user, and a voice profile of the user from the mobile computing device; wherein the processor processes the first output audio signal according to the first hearing profile in the first mode, processes the second output audio signal according to the second hearing profile in the second mode, and processes the input audio signal from the secondary microphone according to the voice profile in the first mode; and wherein the wireless receiver comprises a wireless transceiver wirelessly transmitting processed form of the input audio signal to the mobile computing device and receiving the first output audio signal from the mobile computing device substantially simultaneously in the first mode.

7. The apparatus of claim 1, wherein the secondary audio output module comprises an audio induction loop adjacent the integrated loudspeaker and broadcasting a magnetic field corresponding to the processed form of the output audio signal.

8. The apparatus of claim 1, wherein the processor detects an ambient noise condition based on an output of the secondary microphone and processes the output audio signal according to the hearing profile to compensate for the ambient noise condition.

9. The apparatus of claim 8, further comprising an accelerometer arranged within the housing, the processor calculating an acceleration of the mobile computing device based on an output of the accelerometer, withholding application of an ambient audio signal from the secondary microphone to the output audio signal in response to the acceleration that exceeds a threshold acceleration, and processing the output audio signal according to the hearing profile to compensate for the ambient audio signal in response to the acceleration that falls below the threshold acceleration for a threshold period of time.

10. The apparatus of claim 8, wherein the processor comprises an audio codec and a controls processor, the audio codec processing the output audio signal according to the hearing profile.

11. The apparatus of claim 1, further comprising a secondary battery arranged within the housing and powering the processor and the secondary audio output module, the secondary charging port electrically coupled to the secondary battery and receiving the charging connector to recharge the battery.

12. The apparatus of claim 11, wherein the processor selectively diverts electrical power, received from the charging connector through the charging port, between the integrated charging port and the secondary battery to simultaneously charge the integrated battery and the secondary battery.

13. The apparatus of claim 12, wherein the processor selectively diverts electrical power between the secondary battery and the integrated battery, via the integrated charging port, to maintain the secondary battery and the integrated battery in substantially similar states of charge.

14. The apparatus of claim 1, further comprising an audio jack, the processor selectively routing the processed form of the output audio signal from the secondary audio output module to the audio jack in response to connection of a peripheral audio device to the audio jack.

15. The apparatus of claim 14, wherein the processor predicts a type of the peripheral audio device connected to the audio jack based on an impedance of the peripheral audio device and processes the output audio signal according to an audio output profile corresponding to the type of the peripheral audio device.

16. The apparatus of claim 1, wherein the communication module receives a location datum from the mobile computing device; and wherein the processor selects a particular audio output profile, from a set of audio output profiles stored locally in memory arranged within the housing, based on the location datum, the processor processing the output audio signal according to the hearing profile and the particular audio output profile.

17. The apparatus of claim 1, further comprising a proximity sensor arranged within the housing adjacent the secondary audio output module, and wherein the processor reduces a maximum audio output volume from the secondary audio output module in response to detection of a surface proximal the housing based on an output of the proximity sensor.

18. An apparatus for augmenting audio capabilities of a mobile computing device, the mobile computing device comprising an integrated loudspeaker proximal a first end of the mobile computing device, an integrated microphone proximal a second end of the mobile computing device opposite the first end, an integrated battery, and an integrated charging port electrically coupled to the battery, the apparatus comprising:
- a housing transiently encasing a portion of the mobile computing device;
- a communication module arranged within the housing, downloading hearing data of a user from the mobile computing device, and receiving an output audio signal from the mobile computing device;
- a processor arranged within the housing, generating a hearing profile of the user based on the hearing data, and processing the output audio signal according to the hearing profile;
- a secondary audio output module arranged within the housing adjacent the integrated loudspeaker and outputting a processed form of the output audio signal in place of output of the output audio signal by the integrated loudspeaker;
- a secondary microphone arranged within the housing adjacent the integrated microphone, the communication module transmitting an input audio signal from the secondary microphone to the mobile computing device; and
- a secondary charging port arranged within the housing and communicating electrical current into the integrated charging port to recharge the mobile computing device.

19. The apparatus of claim 18, wherein the housing comprises a first portion and a second portion; the first portion of the housing containing the communication module, the processor, and the secondary microphone; the second portion of the housing containing the secondary audio output module and transiently engaging the first portion to substantially encase the mobile computing device.

20. The apparatus of claim 18, wherein the secondary charging port comprises an induction coil that harvests electrical current from a local electromagnetic field and a plug that engages the integrated charging port to communicate electrical current into the mobile computing device.

21. A method for augmenting audio capabilities of a mobile computing device, the method comprising:
- at a peripheral device, receiving a hearing profile of a user from the computing device coupled to the peripheral device; wherein receiving the hearing profile of the user from the computing device comprises receiving a first hearing profile of the user and a second hearing profile of the user from the computing device over a wired connection;
- generating a voice profile of the user based on audio data collected through a microphone coupled to the peripheral device;
- during a telephone call established with the computing device:
    - at the peripheral device, processing an output audio signal according to the hearing profiles of the user, the output audio signal received from the computing device; wherein processing the output audio signal comprises processing a first audio output profile, received from the computing device over wireless communication protocol during the phone call, according to the first hearing profile; and further comprising processing a second audio output profile, received from the computing device over a wired connection during recorded audio playback, according to the second hearing profile;
    - outputting a processed form of the output audio signal through an audio output module coupled to the peripheral device;
    - processing an input audio signal from the microphone according to the voice profile of the user; and
    - transmitting a processed form of the input audio signal to the computing device.

22. The method of claim 21, wherein outputting the processed form of the output audio signal comprises outputting the processed form of the output audio signal, through the audio output module integrated into the peripheral device, substantially in real-time during the telephone call; and wherein transmitting the processed form of the input audio signal to the computing device comprises transmitting the processed form of the input audio signal to the computing over wireless communication protocol substantially in real-time during the telephone call.

\* \* \* \* \*